(12) United States Patent
Berger et al.

(10) Patent No.: US 6,354,470 B1
(45) Date of Patent: Mar. 12, 2002

(54) DISPENSER PACKAGE

(75) Inventors: Lora Berger, Bridgewater, NJ (US); Anthony Shurman, New York, NY (US); Jerry Zinnbauer, Cornelius, NC (US)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

(21) Appl. No.: 09/428,321

(22) Filed: Oct. 28, 1999

(51) Int. Cl.[7] .............................................. G01F 11/10
(52) U.S. Cl. ...................................................... 222/363
(58) Field of Search .......................... 222/363; 221/266, 221/263

(56) References Cited

U.S. PATENT DOCUMENTS

| | | | | |
|---|---|---|---|---|
| 853,658 A | * | 5/1907 | Terry | 222/363 |
| 1,278,841 A | * | 9/1918 | Brano | 222/363 |
| 1,560,013 A | * | 11/1925 | Angeletti | 222/363 |
| 1,577,235 A | * | 3/1926 | Hucks | 222/363 |
| 1,710,295 A | * | 4/1929 | Campbell | 222/363 |
| 1,720,096 A | * | 7/1929 | Schofield | 222/363 |
| 1,773,329 A | * | 8/1930 | Upham | 221/266 |
| 2,611,516 A | * | 9/1952 | Beldner | 221/266 |
| 5,169,036 A | * | 12/1992 | Tong | 222/363 |
| 5,437,393 A | * | 8/1995 | Blicher et al. | 222/363 |
| 5,499,749 A | * | 3/1996 | Connant | 222/363 |

* cited by examiner

*Primary Examiner*—Philippe Derakshani
*Assistant Examiner*—Thach H. Bui
(74) *Attorney, Agent, or Firm*—Darryl C. Little

(57) ABSTRACT

The present invention relates to dispenser packages comprising a housing which defines a chamber and chamber opening for holding dispensable objects and a lid for selectively opening and closing access to the chamber through the chamber opening. In one embodiment, the dispenser package may be a candy dispenser having a housing and a rotatable top secured to the top of the housing.

19 Claims, 9 Drawing Sheets

DISPENSER PACKAGE

FIELD OF INVENTION

The present invention relates to dispenser packages. More particularly, the present invention relates to hand-held candy dispenser packages.

BACKGROUND OF THE INVENTION

Various designs for candy dispenser packages are known in the prior art. They range from simple paper boxes to more elaborate plastic containers with hinges or flaps to dispense the candy. Some prior art candy dispensers include means to reseal the package to maintain the freshness of any unused candy. The design of candy packages must meet the needs of the manufacturer and the consumer.

A consideration in designing candy packages is ease of manufacture. More elaborate designs typically require more components to be produced and then assembled. This adds to the cost of materials, the cost of tooling and the time that it takes to manufacture and assemble the product. Ultimately, complicated candy dispenser packages increase the price of the final product. Thus, simpler designs are preferred to reduce the manufacturing time and cost.

Another manufacturing concern is the ease of which the package is filled. It is preferred to have a package design that can easily be filled with the product and then sealed to be ready for shipment. Prior art packages typically require complicated machinery to fill such packages with candy. The more steps required to fill the package also add to the cost of production.

From the consumer's perspective, ease of operation and attractiveness are important considerations in designing candy packages. For instance, it is preferable to have a package that can be easily opened with one hand. It is also preferable for the consumer to be able to easily reseal the package after removing a desired quantity of candy to maintain the freshness of the candy remaining in the package.

Another consideration is the ability for the consumer to be able to select the size of an access opening to the product. This will allow for the selective removal of a small or large quantity of candy. In prior art packages, the opening provided by the manufacturer is often too small or too large. Thus, the candy product either clogs the opening making it difficult to remove or comes out too fast.

Another consideration is the durability of the package. Frequently, candy packages are pushed into pants pockets or in a purse and are subjected to rigorous flexing and prolonged contact with other items. Less durable candy packages often fail and expose the candy to elements outside the package such as dirt or lint, etc.

While the market is filled with various candy package designs, there remains a need for a design that incorporates the foregoing needs of the manufacturer and consumer.

SUMMARY OF THE INVENTION

The present invention addresses these needs as follows.

In accordance with one aspect of the invention, there is provided a dispenser package comprising a housing defining a chamber for holding dispensable objects; the housing includes opposing side walls and an open section through which the dispensable objects can be placed into and removed from the chamber: A lid is arranged on the housing for selectively opening and closing access to the chamber through the open section in the housing. The lid is preferably secured to the side walls of the housing and is rotatable about an axis of rotation between an open position where the dispensable objects can be removed from the chamber and a closed position where the dispensable objects cannot be removed from the chamber.

Preferably, the a lid of the dispenser package is partially cylindrical. The lid may have an arcuate top section extending between at least one pair of opposing side walls. It is also preferable for at least one pair of the side walls of the lid and the housing to include pins extending along the axis of rotation, and the other pair of opposing side walls of the lid and the housing to include an aperture in which corresponding ones of the pins are arranged.

More preferably, the pins extend inwardly along the axis of rotation from the pair of opposing side walls of the lid. In this preferred embodiment, the housing includes apertures in the side walls in which corresponding ones of the pins are arranged.

It is also preferred that the arcuate top section of the dispenser package includes a surface that extends less than 360° about the axis of rotation. It is also preferred that the dispenser is sized to be hand-held.

Preferably, the dispenser lid has a projection and the top section of the housing includes a ledge, where the projection and ledge collectively act as a stop to limit the rotation of the lid in the fully open position. It is also preferable that the lid of the dispenser includes a handle used for rotating the lid between the open and closed positions. In another preferred embodiment, the dispenser package is a candy dispenser and the dispensable objects are solid pieces of candy.

In yet another preferred embodiment, the lids of the candy dispenser has a substantially cylindrical shell configuration including an arcuate top section having a surface that defines a perimeter and extends less than 360° around the axis of rotation. The top section of the lid also includes an open area that extends around the remainder of the 360° perimeter. It can be said that the open area of the top section is notched out in order to provide an advantageous dispensing port.

It is preferable for the lid of the candy dispenser to comprise opposing side walls and to have support members connected between the arcuate top section and corresponding ones of the opposing side walls. Most preferably, the candy dispenser is sized to be hand-held and where the lid has a projection and the top section of the housing includes a ledge collectively acting as a stop to limit the rotation of the lid in a fully open position.

DETAILED DESCRIPTION OF THE PREFERRED EMBODIMENTS

A dispenser package is shown in FIGS. 1–9. The dispenser package 10 includes a housing 12 that defines a chamber therein for retaining solid pieces of candy 60, or other dispensable objects. It is preferable that the entire dispenser package 10 be made of a polymeric material, such as plastic. However, the material of which the dispenser package 10 is made is not a limited feature of the present invention. Thus, other materials may be suitable.

Figure 1:
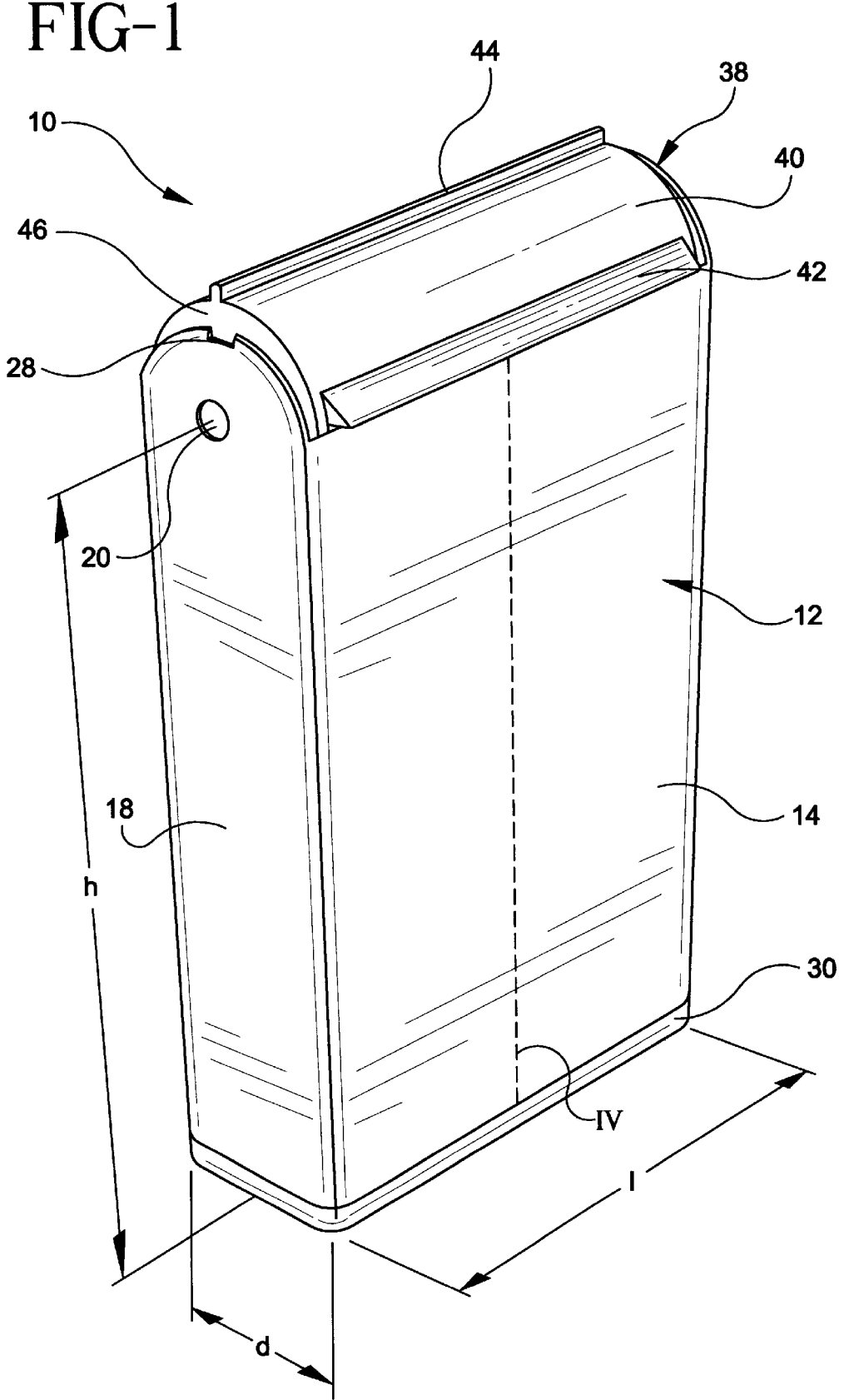
FIG. 1 is a perspective view of the present dispenser package in a closed position.
Figure 2:
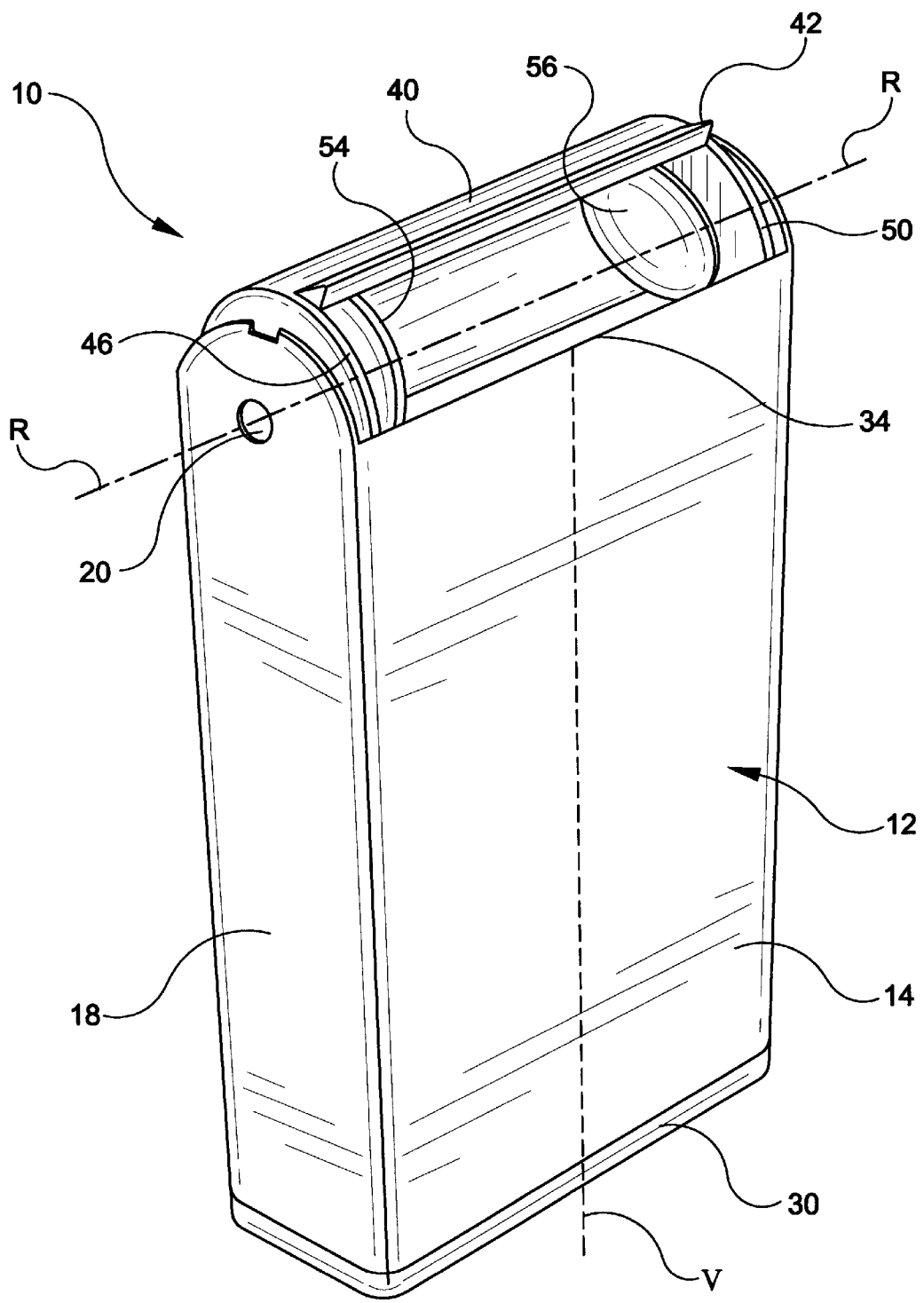
FIG. 2 is a perspective view of the present dispenser package in a fully open position.
Figure 3:
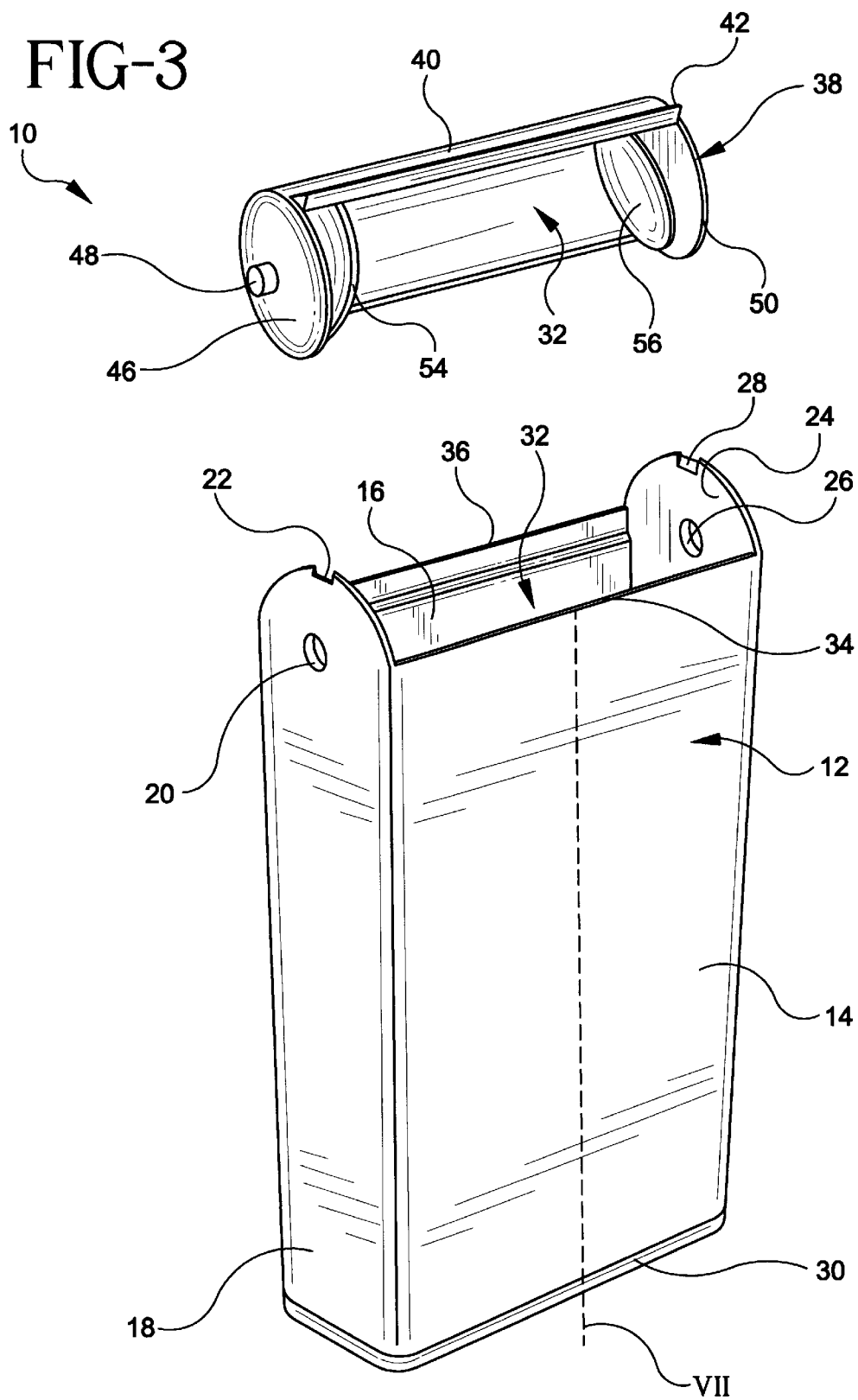
FIG. 3 is an exploded view of the dispenser package shown in FIGS. 1.
Figure 4:
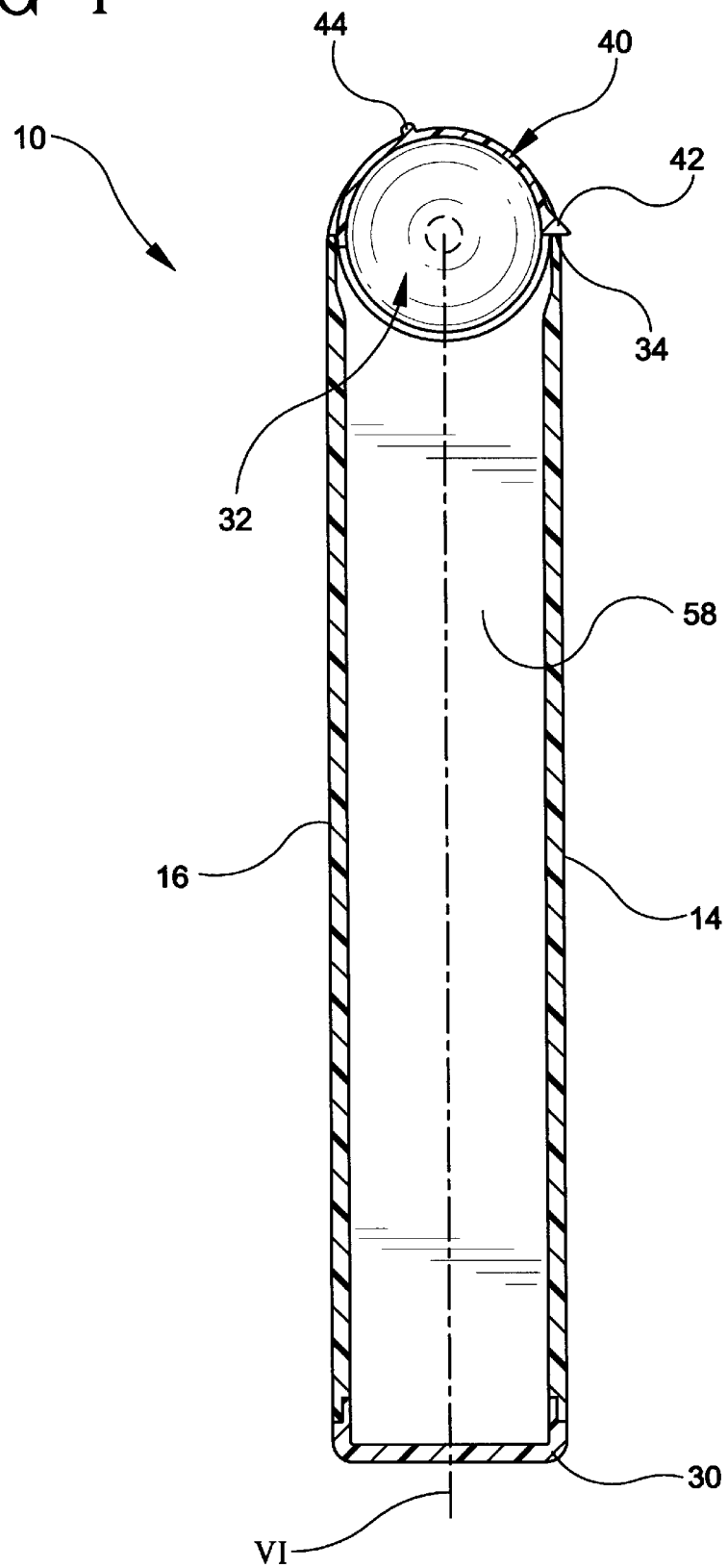
FIG. 4 is a side cross-sectional view of the present dispenser package taken along line IV—IV.
Figure 5:
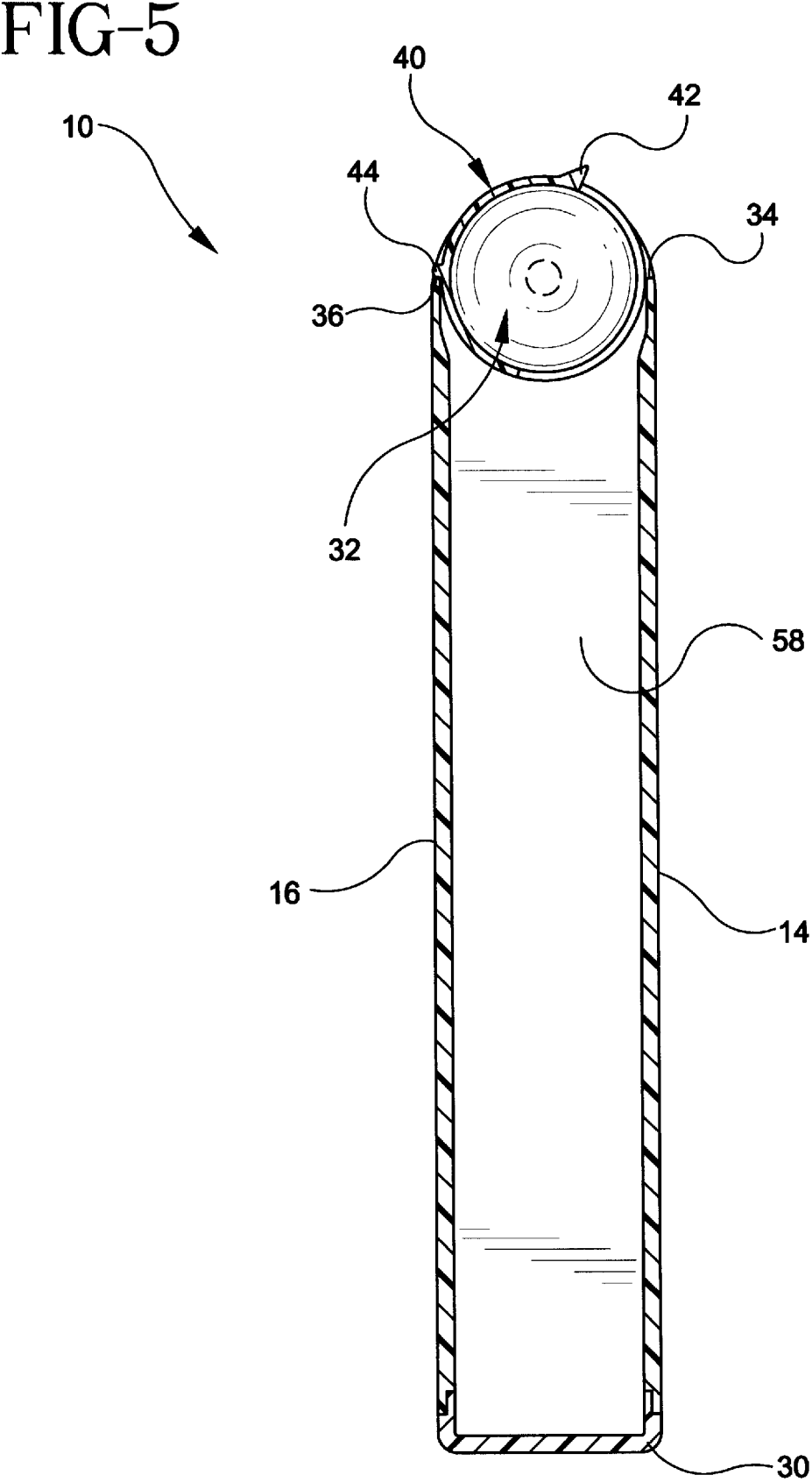
FIG. 5 is a side cross-sectional view of the present dispenser package taken along line V—V of FIG. 2.

As illustrated in FIGS. 1–7, the housing 12 includes a front wall 14 and an opposing rear wall 16. The housing 12 also includes a left side wall 18 and an opposing right side wall 24. The left and right side walls 18 and 20 include a rounded top section as best shown in FIGS. 1–3. However, it should be appreciated that the top portion of the left and right side walls 18 and 20 can include various geometric configurations in alternate embodiments.

The left side wall 18 includes an aperture 20 near the top portion and a notch 22 at the peak of the top portion. The right side wall 24 is symmetrical and thus also includes an aperture 26 and a notch 28 at the peak of the top portion. The purpose of the corresponding apertures 20 and 26 will be apparent when discussed below in correspondence with the dispenser lid 38. As shown in FIG. 2, an imaginary axis of rotation R extends through the center of corresponding left and right side apertures 20 and 26.

FIGS. 1–9 illustrate that the housing 12 includes a base 30 connected to the front and rear walls 14 and 16, and to the left and right side walls 18 and 24. In the preferred embodiment of FIGS. 1–9, the base 30 is connected to the bottom of the housing 12 by a suitable adhesive that meets all required FDA standards. However, in alternate embodiments, the base 30 can be connected to the walls 14, 16, 18 and 24 by a friction fit constructions. Still further, the housing 12 may be an integrally molded structure where the base 30 does not require connection through the use of adhesive material or other conventional techniques.

The housing 12 also includes an open top section 32 as illustrated in FIGS. 2–9. The front wall 14 includes a top edge 34, and the rear wall 16 includes a top edge 36 that defines the size of the open top section 32 extending between the top portions of left and right side walls 18 and 24. The top edge 34 of front wall 14 and the top edge 36 of rear wall 16 provide corresponding stops with respect to portions of the lid 38 as discussed further below.

Although the configuration and dimensions of the housing 12 can vary in alternate embodiments, it is preferable that the dispenser package 10 be sized for hand-held uses. In one preferred embodiment, and by way of example only, the base 30 is shown in FIG. 1 as having a total length L of about 48 mm and defining a depth D of about 18 mm. In a preferred range, the length L may be between about 30–60 mm and the depth D may be between about 10–30 mm.

Similarly, the height of the front and rear walls 14 and 16 is shown in FIG. 1 by reference letter H and may be about 70 mm in a preferred embodiment. In a preferred range, the height H may be between about 40–100 mm. All of the foregoing ranges are provided by way of example only. The actual dimensions of the various portions of the housing 12 can be smaller or larger than those set forth above. Also by way of example, the diameter "A" of the left and right apertures 20 and 26 may be about 2 millimeters.

A significant aspect of the present invention relates to the construction of the lid 38 and its relationship to the housing 12. In particular, as clearly shown in FIGS. 1–5, 8 and 9, the lid 38 has the general configuration of a hollow cylinder as it includes a top section having an arcuate outer surface 40. A front handle 42 extends along substantially the entire length of the arcuate outer surface 40 and projects slightly outwardly therefrom.

A rear stop 44 also extends along substantially the entire length of the arcuate outer surface 40 and projects outwardly therefrom spaced from the handle 42. In alternate embodiments, it should be understood that the handle 42 and the rear stop 44 need not extend along substantially the entire length of the arcuate outer surface 40. In fact, the handle 42 and rear stop 44 are optional features of the lid 38.

Figure 6:
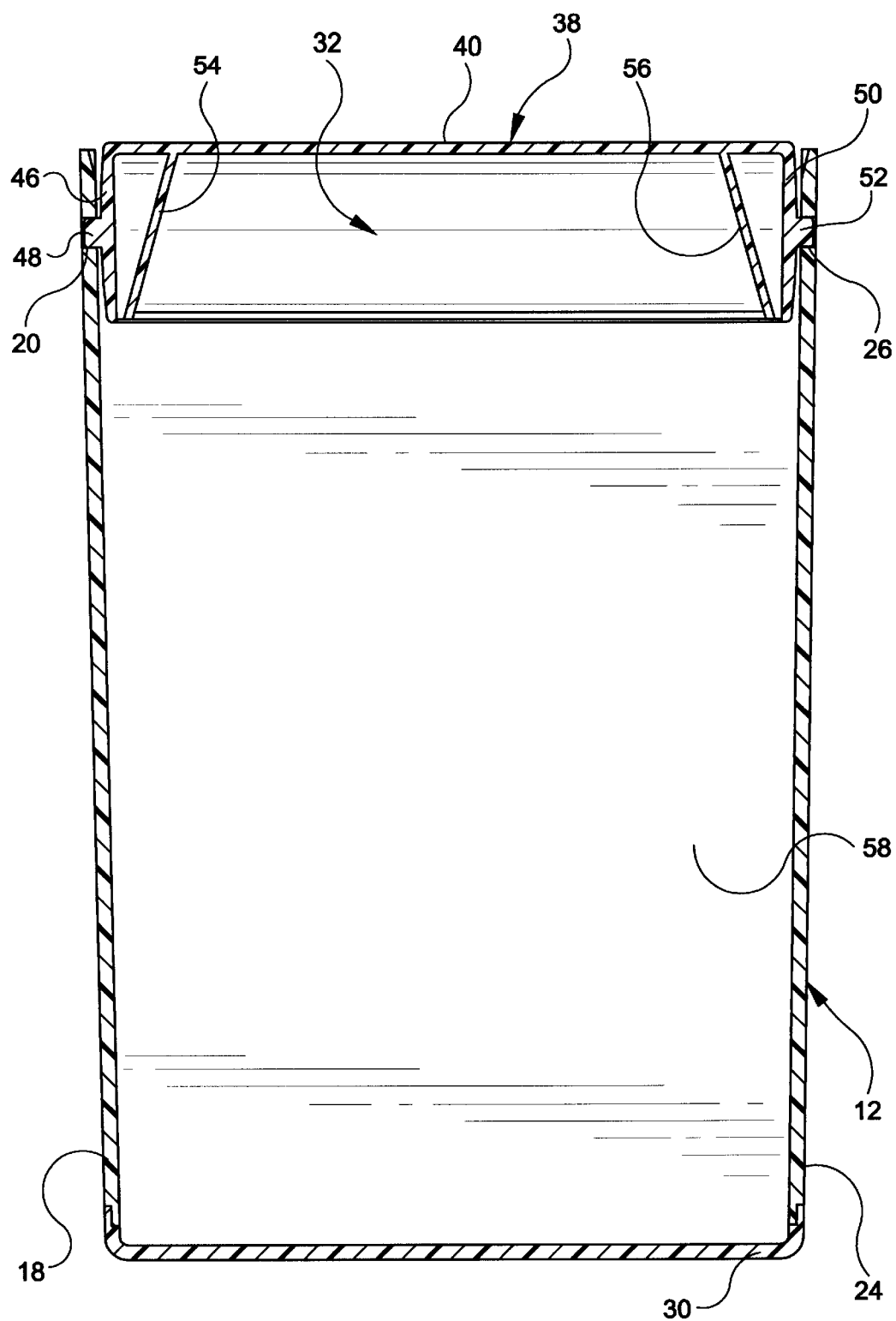
FIG. 6 is a front cross-sectional view of the present dispenser package taken along line VI—VI of FIG. 1.
Figure 7:
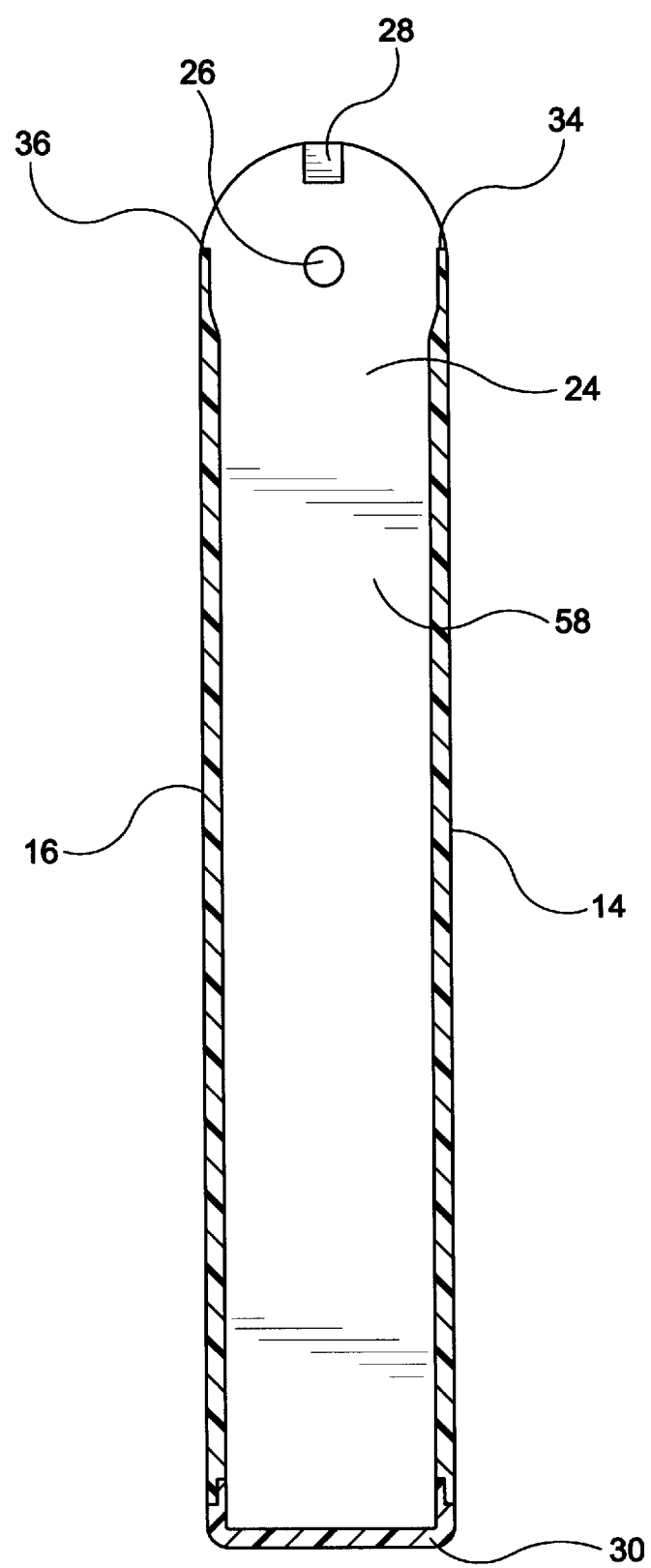
FIG. 7 is an isolated side cross-sectional view of only the housing of the present dispenser package taken along line VII—VII of FIG. 3

As best shown in FIGS. 3 and 6, the lid 38 includes generally circular opposing left and right side walls 46 and 50. The arcuate outer surface 40 extends between, and is connected to, the opposing left and right side walls 46 and 50. The left side wall 46 of the lid 38 includes an outwardly extending integral post 48, while the right side wall 50 also includes an outwardly extending integral post 52.

FIGS. 2, 3 and 6 illustrate that the lid 38 also includes left and right side support members 54 and 56 that are integrally connected to, and extend at an angle between, opposing portions of the inner surface of the arcuate top section of the lid. The support members 36 are optional features of the lid 38 and are intended to provide additional structural integrity and durability.

When the lid is in assembled position as shown in FIGS. 1, 2, 4, 6, 8 and 9, the left and right side posts 48 and 52 extend into corresponding apertures 20 and 26 near the top of the left and right side walls 18 and 24 of the housing 12. The axis of rotation R thus extends through the center of the left and right side posts 48 and 52 of the lid 38.

As also evident from FIGS. 3–5, 8 and 9, the lid 38 includes an open area (unnumbered), which can also be described as a notched out area. The open area extends approximately half way around the circumference of left and right side walls 46 and 50, while the arcuate top surface 40 extends around the other half of the circumference of left and right side walls 46 and 50. Thus, in a preferred embodiment, the arcuate top surface 40 can be said to extend about 180° around an imaginary circumference of the generally cylindrical shaped lid 38, and the notched out open area (unnumbered) also extends about 180° around the imaginary circumference. It should be appreciated that in alternate embodiments, the arcuate top surface 40 may extend greater or less than 180° around the imaginary circumference, through which the axis of rotation R extends, when the lid 38 is in assembled position on the housing 12.

Figure 8:
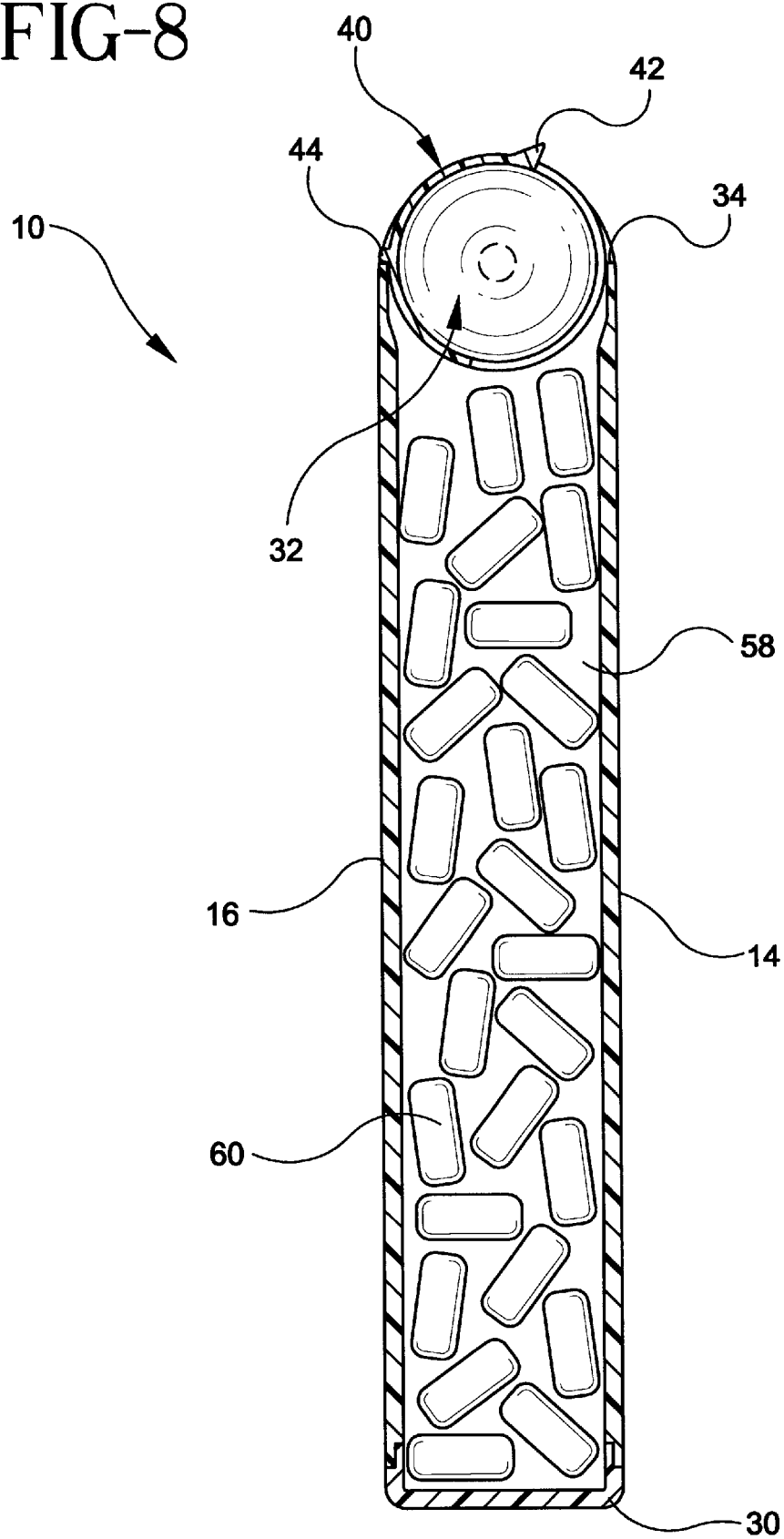
FIG. 8 is the same side cross-sectional view of the dispenser package of FIG. 5 where dispensable objects are randomly arranged in the housing chamber.
Figure 9:
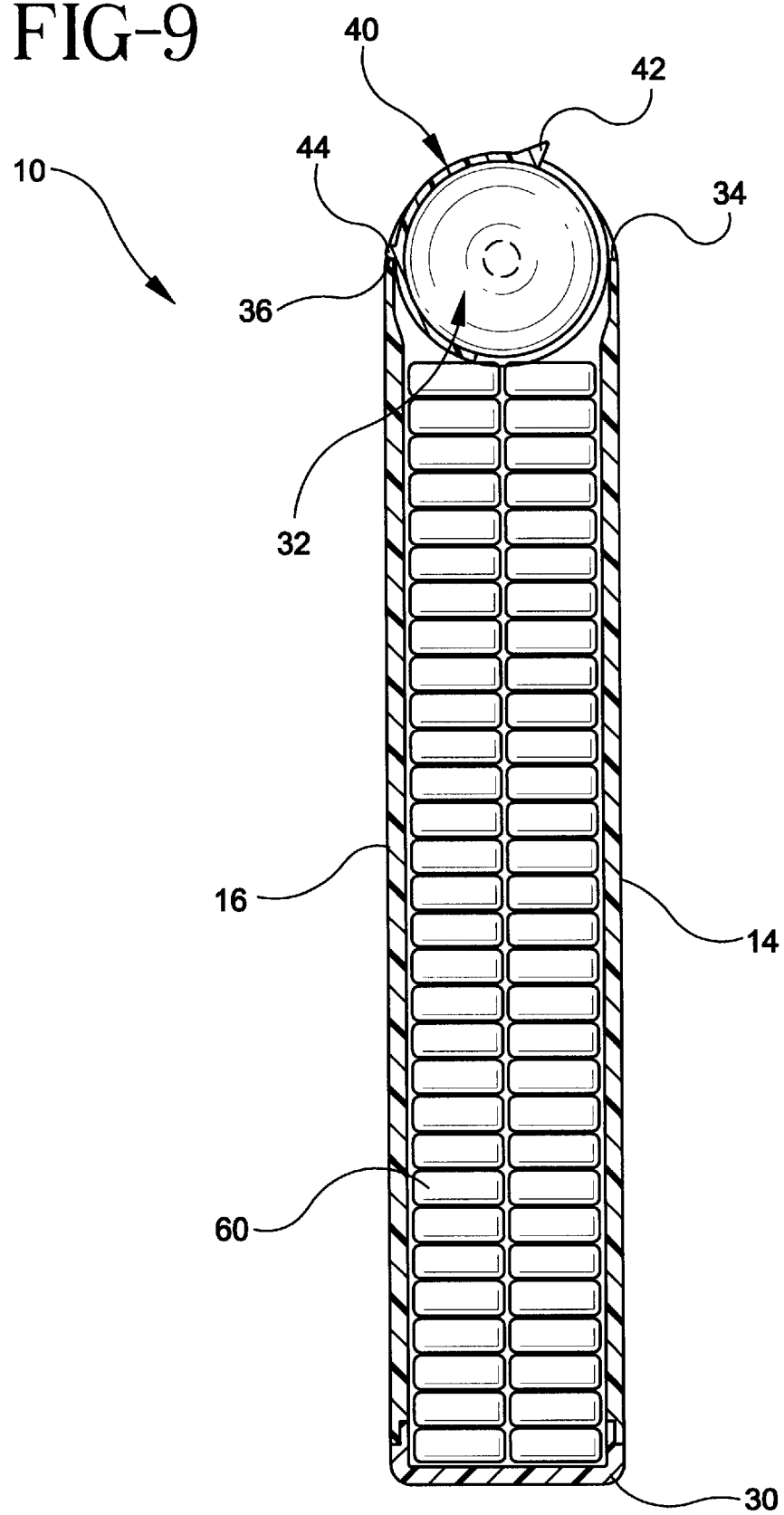
FIG. 9 is the same side cross-sectional of the dispenser package of FIG. 8 where the dispensable objects are orderly arranged in the housing chamber.

As clearly shown in FIGS. 4–9, the housing 12 defines a chamber 58 in which pieces of candy 60, or other dispensable objects, can be retained. FIG. 8 illustrates solid pieces of candy 60 randomly displaced within the chamber 58 while FIG. 9 illustrates pieces of candy 60 neatly stacked within the chamber 58 of the housing 12.

One advantage of the present invention is that after the housing 12 is manufactured, the open top section 32 thereof facilitates filling of the chamber 58 with solid pieces of candy. After the chamber 58 has been filled with candy 60 as illustrated in FIG. 8 (randomly) and FIG. 9 (orderly), the lid 38 is then preferably placed into assembled position with the left and right mounting posts 48 and 52 arranged within corresponding left and right side apertures 20 and 26 of side walls 18 and 24.

In operation, the lid 38 can rotate about the axis R between a fully closed position (as shown in FIGS. and 4) and a fully open position (as shown in FIGS. 2, 5, 8 and 9). When the lid 38 is in a fully closed position, the handle 42 will preferably abut the top edge 34 of front wall 14. In order to open the lid 38, a user can simply place a finger beneath the outwardly projecting handle 42 and rotate the lid 38 about the axis R until the handle 38 is at a desired distance from the top edge 34 of front wall 14, such as that shown in FIG. 2. In the embodiment shown in FIGS. 1–9, the stop member 44 projects outwardly from the arcuate outer surface 40 of the lid 38 spaced from the handle 42 at an angle of about 90° with respect to the cylindrical circumference of the lid 38. Although the handle 42 can be rotated about the axis R to various degrees of open positions, the stop member 44 is useful to limit rotation of the handle 42 in a fully opened position as shown in FIGS. 2, 5, 8 and 9. In particular, the stop member 44 will abut the top edge 36 of rear wall 16 when the lid 38 is rotated to a fully open position.

The structural features of the dispenser package 10 including the unique lid 38 and the combination between the lid 38 and housing 12 provides several additional advantages over prior art dispenser packages. The advantages include, but are not limited to, enhanced durability, the option of one handed use by the customer, simplified manufacturing procedures, simplified filling procedures (due to the top being applied after the product is filled in the chamber of the housing), decreased manufacturing costs, the ability to seal and reseal the dispenser package, and the ability of the user to select the size of the dispenser port opening.

It should be appreciated that although preferred embodiments of the present invention are discussed above, those of skill in the art are encouraged to modify the disclosed structure and arrangement of various features of the present dispenser package without departing from the scope of the present invention, which is defined by the claims set forth below.

We claim:

1. A handheld dispenser package comprising:
    a housing defining a chamber for holding dispensable objects, said housing including opposing side walls and an open section through which said dispensable objects can be placed into and removed from said chamber; and
    a lid arranged on said housing, said lid having a notched out area for selectively opening and closing access to said chamber through said open section of said housing, said lid being secured to said side walls of said housing and being rotatable about an axis of rotation between an open position where said dispensable objects can be removed from said chamber and a closed position where said dispensable objects cannot be removed from said chamber and wherein the size of the opening providing access to the chamber is visible to the user for adjusting the size of the opening providing access to the chamber to allow for the selective removal of small or large quantities of the dispensable objects.

2. The dispenser package of claim 1 wherein said lid is partially cylindrical, said lid having an arcuate top section and opposing side walls, at least one pair of said side walls of said lid and said housing including pins extending along said axis of rotation, and the other pair of opposing side walls of said lid and said housing including an aperture in which corresponding ones of said pins are arranged.

3. The dispenser package of claim 2 where said arcuate top of said lid includes a surface that extends less than 360° about said axis of rotation.

4. The dispenser package of claim 1 wherein said lid comprises opposing side walls and pins extending inwardly from said opposing side walls along the axis of rotation, said housing includes apertures in said side walls in which corresponding ones of said pins are arranged.

5. The dispenser package of claim 1 where said dispenser is sized to be hand-held.

6. The dispenser package of claim 1 where said lid has a projection and said top section of said housing includes a ledge, said projection and said ledge collectively acting as a stop to limit rotation of said lid in a fully open position.

7. The dispenser package of claim 1 where said lid has a handle used for rotating said lid between said open and closed positions.

8. A handheld candy dispenser comprising:
    a housing defining a chamber for holding solid candy pieces, said housing including opposing side walls and an open section through which said candy can be placed into and removed from said chamber; and
    an arcuate lid arranged on said housing, said lid having a notched out area for selectively opening and closing access to said chamber through said open section of said housing, said lid being secured to said side walls of said housing and being rotatable about an axis of rotation between one of a plurality of open positions where said candy can be withdrawn from said chamber and a closed position where said candy cannot be removed from said chamber and wherein the size of the opening providing access to the chamber is visible to the user for adjusting the size of the opening providing access to the chamber to allow for the selective removal of small or large quantities of the dispensable objects.

9. The candy dispenser of claim 8 wherein said lid is partially cylindrical, said lid having opposing side walls, at least one pair of said side walls of said lid and said housing including pins extending along said axis of rotation, and the other pair of opposing side walls of said lid and said housing including an aperture in which corresponding ones of said pins are arranged.

10. The candy dispenser of claim 9 where said arcuate lid includes a top surface that extends less than 360° about said axis of rotation.

11. The candy dispenser of claim 8 wherein said lid comprises opposing side walls and pins extending inwardly from said opposing side walls along the axis of rotation, said housing includes apertures in said side walls in which corresponding ones of said pins are arranged.

12. The candy dispenser of claim 8 where said dispenser is sized to be hand-held.

13. The candy dispenser of claim 8 where said lid has a projection and said top section of said housing includes a ledge, said projection and said ledge collectively acting as a stop to limit the rotation of said lid in a fully open position.

14. The candy dispenser of claim 8 where said lid has a handle used for rotating said lid between said open and closed positions.

15. A handheld candy dispenser comprising:
    a housing defining a chamber for holding solid candy pieces, said housing including opposing side walls and an open section through which said dispensable candy objects can be placed into and removed from said chamber; and
    a lid arranged on said housing, said lid having a notched out area for selectively opening and closing access to said chamber through said open section of said housing, said lid being secured to said side walls of said housing and being rotatable about an axis of rotation between one of a plurality of open positions where said candy can be withdrawn from said chamber and a closed position where said candy cannot be removed from said chamber, said lid having a substantially cylindrical shell configuration including an arcuate top section having a surface that defines a perimeter and extends less than 360° around said axis of rotation, said notched out area forming an open area on said top section of said lid that extends around the remainder of the 360° perimeter and wherein the size of the opening providing access to the chamber is visible to the user for adjusting the size of the opening providing access to the chamber to allow for the selective removal of small or large quantities of the dispensable objects.

16. The candy dispenser of claim 15 where said lid further comprises opposing side walls, and support members connected between said arcuate top section and corresponding ones of opposing side walls.

17. The candy dispenser of claim 15 where said dispenser is sized to be hand-held.

18. The candy dispenser of claim 15 where said lid has a projection and said top section of said housing includes a ledge, said projection and said ledge collectively acting as a stop to limit the rotation of said lid in a fully open position.

19. A handheld dispenser package comprising:

a housing defining a chamber for holding dispensable objects, said housing including opposing side walls and an open section through which said dispensable objects can be placed into and removed from said chamber; and an integrally molded lid arranged on said housing for selectively opening and closing access to said chamber through said open section of said housing, said lid being secured to said side walls of said housing and being rotatable about an axis of rotation between an open position where said dispensable objects can be removed from said chamber and a closed position where said dispensable objects cannot be removed from said chamber and wherein the size of the opening providing access to the chamber is visible to the user for adjusting the size of the opening providing access to the chamber to allow for the selective removal of small or large quantities of the dispensable objects.

* * * * *